F. A. TIFFT.
SIGNAL MEANS.
APPLICATION FILED JAN. 7, 1916.
1,282,143.
Patented Oct. 22, 1918.
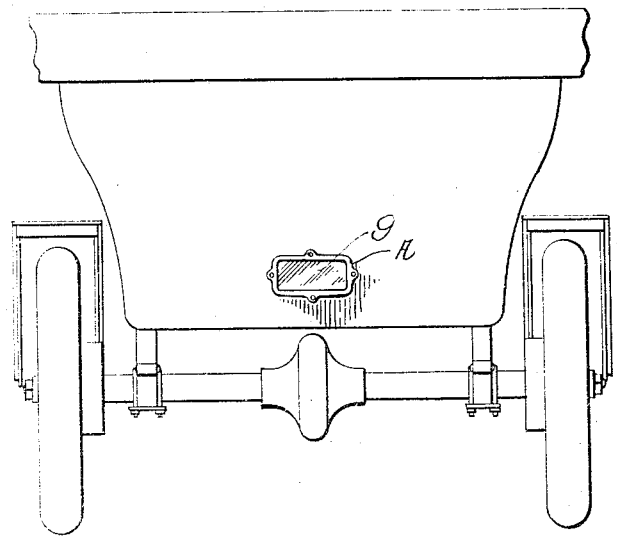
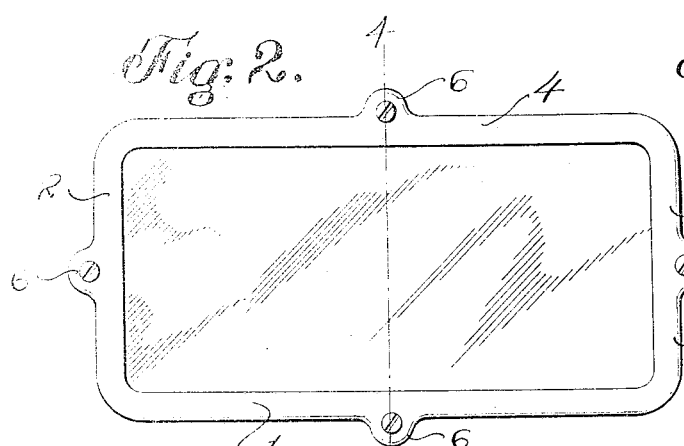
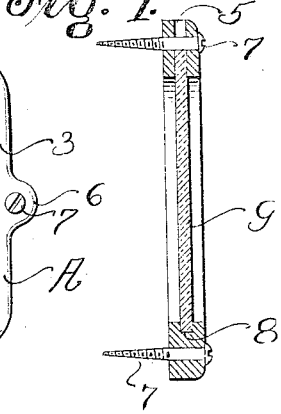
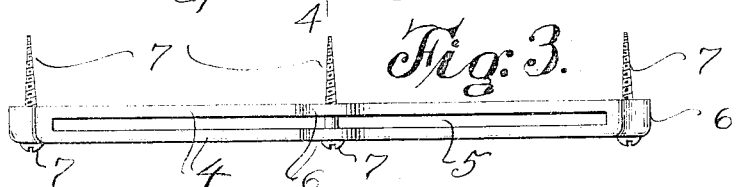
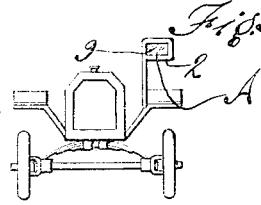
WITNESSES
INVENTOR
Fred A. Tifft.
BY
ATTORNEY

UNITED STATES PATENT OFFICE.

FRED A. TIFFT, OF CORNISH, NEW HAMPSHIRE.

SIGNAL MEANS.

1,282,143.

Specification of Letters Patent.

Patented Oct. 22, 1918.

Application filed January 7, 1916. Serial No. 70,860.

*To all whom it may concern:*

Be it known that I, FRED A. TIFFT, a citizen of the United States, residing at Cornish, in the county of Sullivan and State of New Hampshire, have invented certain new and useful Improvements in Signal Means, of which the following is a specification.

This invention relates to signal means for warning drivers approaching vehicles on dark roads of the presence of such vehicles. It often happens that in driving along country roads one suddenly runs upon a team, automobile or the like carrying no tail light, or that one will approach a vehicle carrying lights but will not be cognizant of the lateral extent of such vehicle and consequently will be doubtful as to the extent to which he should turn out in order to safely pass the vehicle which he is approaching.

One object of the present invention is to provide means for apprising drivers of approaching vehicles thus giving them sufficient time to avoid the danger of an accident.

Another object resides in the form of signal means which consists of a frame accommodating a reflecting surface and such reflecting surface and frame being held in place by the same screws.

With the above and other objects in view, I will now proceed to describe a specific form of my invention which is herein shown by way of illustration.

In the accompanying drawing:

Figure 1 is a rear elevation of an automobile having the device of my invention applied thereto, Fig. 2 is an enlarged elevation of the device removed from the vehicle, Fig. 3 is a top plan view of the same, Fig. 4 is a sectional view on the line 4—4 of Fig. 3, and, Fig. 5 is a diagrammatic view showing the device in position on the left-hand front mud guard of a vehicle.

In detail:

The device comprises the frame A consisting of the bottom 1, sides 2 and 3 and top 4, such top 4 being slotted as shown at 5. The members 1, 2, 3 and 4 are provided with lugs 6 which are apertured to receive screws 7. The bottom member 1 is provided with a groove 8 which receives the lower edge of a reflector, which may be of glass or metal highly polished and having a reflecting surface whereas the top of the reflector is retained, as shown in Fig. 4, in the slot 5 just below the point at which the screw 7 projects therethrough. The reflector is maintained in position on the vehicle by means of the screws 7, which also serve to hold reflector 9 in position within the frame by reason of the fact that the screw 7, in the top piece 4 projects over the edge of the top of the reflector 9 and, when the device is screwed in position the edges of the slot 5 compress sufficiently to securely hold the reflector 9 without danger of rattling and yet the reflector 9 may be easily removed for replacing the same.

In the operation of the device the same may be mounted, as shown in Fig. 1 at the rear of the vehicle; then the rays of light of the approaching vehicle would strike upon the device and will warn the driver of the vehicle behind that another vehicle is in his path and he may guide his vehicle accordingly.

Also the device may be mounted, as shown in Fig. 5 upon the front left-hand mud guard of a vehicle and in that case an approaching vehicle from a forward direction will have the advantage of knowing the lateral extent of the vehicle carrying the device and may be guided accordingly in turning out for the same since the light of such approaching vehicle will strike on the said reflector and show the extent of the mud guards which usually define the extreme outer portion of the vehicle.

While in the foregoing I have described a specific embodiment of the present invention, it is nevertheless to be understood, that, in practice I may resort to such practical modifications as fall within the scope of the appended claim.

I claim:

A reflector frame of rectangular shape having grooves in the inner faces of its end and bottom members and a slot in its top member, a reflecting plate inserted in said frame through said slot and having its bottom and ends engaged in said grooves, the upper edge of said plate being disposed below the upper edge of said top member, and a screw passing through said top member above the upper edge of said plate for holding the frame upon a body, preventing upward movement of said plate and forcing the portions of said top member into clamping engagement with the upper edge of said plate.

In testimony whereof I affix my signature in presence of two witnesses.

FRED A. TIFFT.

Witnesses:
GEORGE A. ROWELL,
WYLLYS A. REDFIELD.